(12) United States Patent
Katagiri et al.

(10) Patent No.: US 7,929,236 B2
(45) Date of Patent: Apr. 19, 2011

(54) APPARATUS AND METHOD FOR WRITING AND READING DATA TO AND FROM TAPE MEDIUM

(75) Inventors: Takashi Katagiri, Kanagawa-ken (JP); Toshiyuki Shiratori, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 168 days.

(21) Appl. No.: 12/348,776

(22) Filed: Jan. 5, 2009

(65) Prior Publication Data

US 2009/0180212 A1    Jul. 16, 2009

(30) Foreign Application Priority Data

Jan. 10, 2008    (JP) .................................. 2008-003741

(51) Int. Cl.
*G11B 5/09*    (2006.01)
(52) U.S. Cl. ....................................................... 360/48
(58) Field of Classification Search .................. None
See application file for complete search history.

(56) References Cited

U.S. PATENT DOCUMENTS

| | | | | |
|---|---|---|---|---|
| 5,194,997 | A | * | 3/1993 | Kozuki et al. .................... 360/48 |
| 5,898,533 | A | * | 4/1999 | Mantey et al. ................... 360/48 |
| 6,532,128 | B1 | | 3/2003 | Bui et al. ...................... 360/74.1 |
| 6,937,412 | B1 | * | 8/2005 | Gill et al. ......................... 360/48 |
| 7,095,583 | B2 | * | 8/2006 | Johnson et al. ............. 360/77.12 |
| 7,522,371 | B2 | * | 4/2009 | Koski et al. ................. 360/77.12 |

FOREIGN PATENT DOCUMENTS

| | | |
|---|---|---|
| JP | 2003/500788 | 1/2003 |
| WO | 00/72323 A1 | 11/2000 |

* cited by examiner

*Primary Examiner* — Jason C Olson
(74) *Attorney, Agent, or Firm* — Zilka-Kotab, PC

(57) ABSTRACT

The present invention enhances the capability to specify a recorded position of designated data, even when a tape medium is run at high speed. A controller of a tape drive includes: a data set generator for generating a data set; a metadata generator for generating metadata including the number of records in the data set and the like; and a writing unit for writing the data set to the tape medium with a high recording density, and writing the metadata to the tape medium with a low recording density. The controller also includes: a movement controller for receiving a record number of a designated record; a reading unit for obtaining the number of records and the like included in the metadata read by running the tape medium at high speed; and a comparison unit for determining whether or not to read the data set by lowering the speed of the tape medium to R/W speed, in comparison with the record number received by the movement controller and the number of records and the like obtained by the reading unit.

17 Claims, 7 Drawing Sheets

|  | LAST DATA SET NUMBER | NUMBER OF RECORDS INCLUDED IN FIRST HALF | NUMBER OF FILE MARKS INCLUDED IN FIRST HALF | NUMBER OF RECORDS INCLUDED IN LATTER HALF | NUMBER OF FILE MARKS INCLUDED IN LATTER HALF |
|---|---|---|---|---|---|
| WRAP 0 | 100 | 1000 | 5 | 2000 | 0 |
| WRAP 1 | 210 | 1500 | 0 | 1000 | 4 |
| ⋮ | ⋮ | ⋮ | ⋮ | ⋮ | ⋮ |

FIG. 6

APPARATUS AND METHOD FOR WRITING AND READING DATA TO AND FROM TAPE MEDIUM

RELATED APPLICATIONS

The present application claims the priority of a Japanese patent application filed Jan. 10, 2008 under application number 2008-3741, which is incorporated herein by reference.

BACKGROUND

The present invention relates to an apparatus and a method for writing and reading data to and from a tape medium. In particular, the present invention relates to an apparatus and a method for writing and reading data, designated by an upper-level apparatus, to and from a recording medium.

In a tape drive such as a linear tape-open (LTO) drive, a SCSI command is used for communicating with a host. Accordingly, a host designates a logical position on a tape by using the number of records, filemarks, a serial number, or the like. A filemark is written to indicate a segment of files after multiple records are written as a file. Here, the size of a record is in variable length.

Meanwhile, an LTO tape drive records data to a tape in recording units called data sets. Although the data amount of a data set is in fixed length, a record is compressed to be stored therein. For this reason, even if the number of a record and the size of all of the records are given, it is difficult to specify a data set in which the record is stored.

Moreover, in LTO, a reading head located just behind a writing head is used to read data immediately after the data is recorded by use of the writing head, so as to check whether or not the data is recorded properly. If the data is not recorded properly, the data is recorded again to a different position (normally, a logically latter position) in data set units or in units smaller than data sets. Thus, even if a data set can be specified, it is difficult to specify the physical position of the data set on a tape.

Against this background, in LTO, information called a tape directory is recorded to a contactless nonvolatile memory called cartridge memory (CM) provided inside a tape cartridge, so that the tape can be moved to a target position at high speed when a SCSI command for position movement such as Locate, Space, or the like is issued. A tape directory usually includes, for each wrap, information such as the last data set number, the number of records contained in the first half, the number of filemarks contained in the first half, the number of records contained in the latter half, and the number of filemarks contained in the latter half. Here, a wrap refers to a group of tracks included in a one-way movement of the head in a linear recording (reciprocal recording) method such as LTO.

When a Locate command or a Space command is executed, the use of such information in a tape directory eliminates the need for a position search conducted by reading all data from the logical beginning of a tape. Accordingly, a tape can be moved to a target position at a higher speed than in the conventional case. However, the record number written in a data set still needs to be read by running the tape from the beginning or the middle of a wrap by the maximum length of one wrap, that is, 600 m to 800 m (by half the length on average), at the rate of approximately 5 to 6 m/sec. Hence, the operation still requires a considerable amount of time.

Meanwhile, for the case of not reading the content of a data set, there is provided a method in which a LPOS, which is a physical position on a tape, is used. Here, the LPOS is read from linear position registration data that is modulated into a pre-recorded servo pattern on a recording medium (refer to Japanese Patent Translation Publication No. 2003-500788, for example). In this case, a physical position within half a wrap is estimated by linear interpolation on the basis of the target record number, by running the tape at a higher rate of approximately 8 to 12 m/sec while reading the LPOS. Thus, the operation can be sped up even more. However, since the estimation is made by linear interpolation, it is more likely that the estimated physical position is wrong in the case where the record sizes are not uniform. In other words, estimation of physical position needs to be repeated so as to perform high-speed movement again in the following cases: although the estimated physical position is attained, the target record is still far ahead of the estimated physical position; the estimated physical position goes further than the target record; and the like.

With the recent tendency of increase in archive data using tapes, an increase is also expected in reference of such archive data. Hence, it would be desirable to enhance performance of a Locate command and a Space command even more. Accordingly, it would be desirable t provide a mechanism and/or method for detecting a record number or the like during high-speed movement of a tape medium.

SUMMARY

One embodiment of the present invention includes an apparatus for writing data designated by an upper-level apparatus to a tape medium, including: a first obtaining unit for obtaining the data designated by the upper-level apparatus; a second obtaining unit for obtaining identification information used by the upper-level apparatus to identify the data obtained by the first obtaining unit; and a writing unit for writing the data obtained by the first obtaining unit to the tape medium at a first frequency, and writing the identification information obtained by the second obtaining unit to the tape medium at a second frequency that is lower than the first frequency.

Another embodiment of the present invention includes an apparatus for reading data designated by an upper-level apparatus from a tape medium, including: a reading unit for reading each piece of identification information as first identification information from the tape medium to which each piece of data is recorded at a first frequency, and to which each piece of the identification information, used by the upper-level apparatus to identify each piece of the data, is recorded at a second frequency that is lower than the first frequency; an obtaining unit for obtaining identification information of specific data designated by the upper-level apparatus as second identification information; and a determination unit for determining whether or not to read the specific data from the tape medium according to the first identification information read by the reading unit and the second identification information obtained by the obtaining unit.

Another embodiment of the present invention includes a method for writing data designated by an upper-level apparatus to a tape medium including: a step for obtaining the data designated by the upper-level apparatus; a step for obtaining identification information used by the upper-level apparatus to identify the data; and a step for writing the data to the tape medium at a first frequency, and writing the identification information to the tape medium at a second frequency that is lower than the first frequency.

Yet another embodiment of the present invention includes a tape medium for recording information, including: a first region to which data is recorded at a first frequency; and a second region to which identification information, used by an apparatus for processing the data to identify the data, is recorded at a second frequency that is lower than the first frequency.

BRIEF DESCRIPTION OF THE DRAWINGS

FIG. 6 is a diagram showing a concrete example of information in a tape directory employed in an embodiment of the present invention.

DETAILED DESCRIPTION

Figure 1:
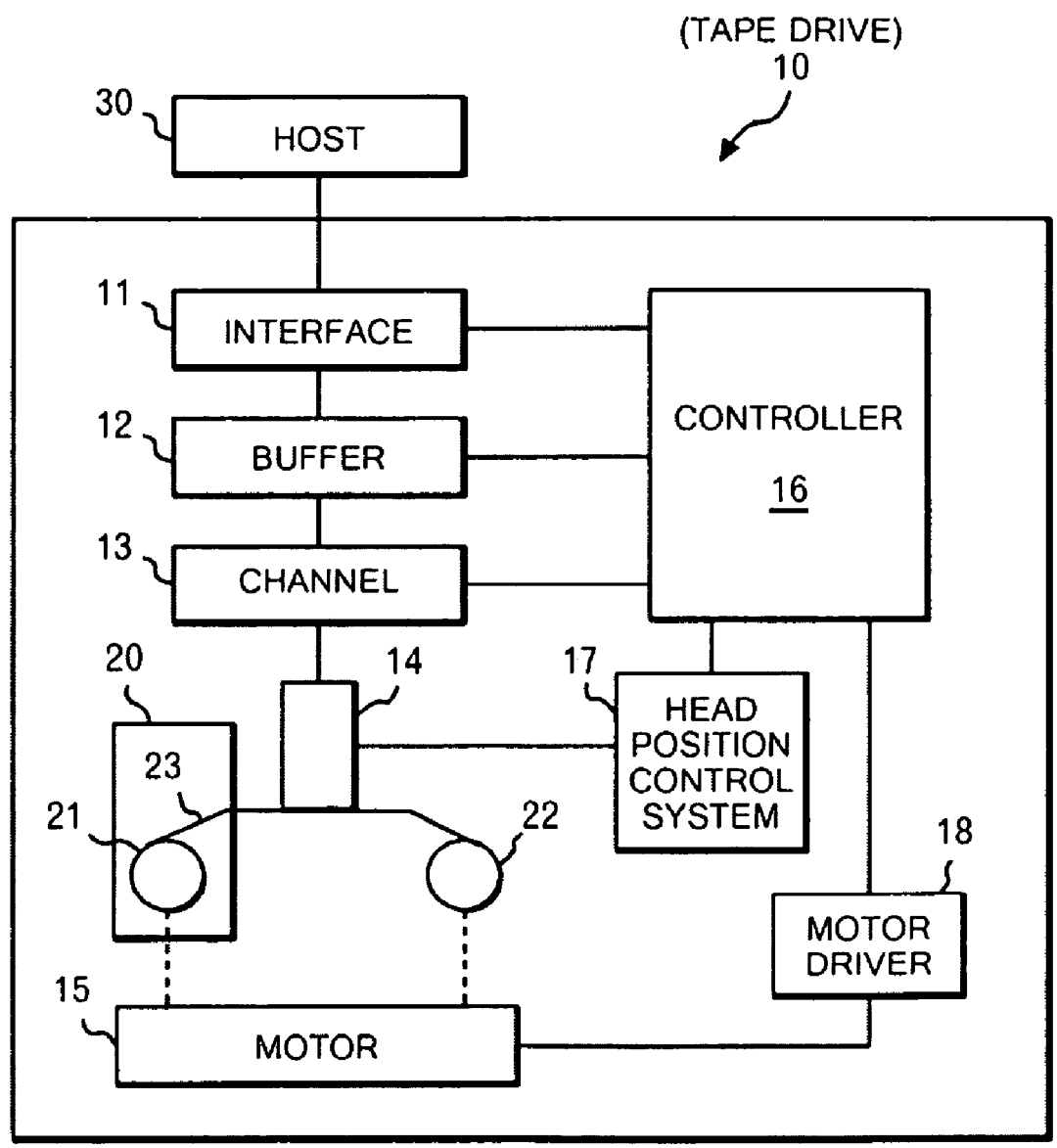
FIG. 1 is a diagram showing a configuration of a tape drive to which an embodiment of the present invention may be applied.

With reference to the drawings, preferred embodiments of the present invention will be described in detail below.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of tape-based storage systems, as well as operation and/or component parts thereof. Particularly, some embodiments of the present invention enhance the capability to specify a recorded position of designated data even when a tape medium is run at high speed.

In one general embodiment, an apparatus for writing data designated by an upper-level apparatus to a tape medium includes a first obtaining unit for obtaining the data designated by the upper-level apparatus; a second obtaining unit for obtaining identification information used by the upper-level apparatus to identify the data obtained by the first obtaining unit; and a writing unit for writing the data obtained by the first obtaining unit to the tape medium at a first frequency, and writing the identification information obtained by the second obtaining unit to the tape medium at a second frequency that is lower than the first frequency.

The writing unit may write the data obtained by the first obtaining unit to a first region on the tape medium, and write the identification information obtained by the second obtaining unit to a second region associated in advance with the first region on the tape medium.

Additionally, the apparatus may further include a first head for writing the data to the tape medium, and a second head for writing the identification information to the tape medium.

Moreover, the second frequency may be approximately the same as that of a servo pattern which is recorded in advance to the tape medium, and which indicates a longitudinal position.

In another general embodiment, an apparatus for reading data designated by an upper-level apparatus from a tape medium includes a reading unit for reading each piece of identification information as first identification information from the tape medium to which each piece of data is recorded at a first frequency, and to which each piece of the identification information, used by the upper-level apparatus to identify each piece of the data, is recorded at a second frequency that is lower than the first frequency; an obtaining unit for obtaining identification information of specific data designated by the upper-level apparatus as second identification information; and a determination unit for determining whether or not to read the specific data from the tape medium according to the first identification information read by the reading unit and the second identification information obtained by the obtaining unit.

The apparatus may further include a first reading head for reading the data from the tape medium, and a second reading head for reading the first identification information from the tape medium.

In addition, the reading unit may read the data by running the tape medium at a first speed, and read the first identification information by running the tape medium at a second speed faster than the first speed.

Moreover, when the determination unit determines to read the specific data, the reading unit reads the specific data by lowering the running speed of the tape medium from the second speed to the first speed.

Furthermore, a portion of the tape medium to which each piece of data is recorded, and a portion of the tape medium to which identification information of each piece of the data is recorded may overlap with each other transversely on the tape medium. When the determination unit determines to read the specific data, the reading unit may read the specific data by running the tape medium in the reverse direction and then running the tape medium in the forward direction again at the first speed.

In another general embodiment, a method for writing data designated by an upper-level apparatus to a tape medium includes obtaining the data designated by the upper-level apparatus; obtaining identification information used by the upper-level apparatus to identify the data; and writing the data to the tape medium at a first frequency, and writing the identification information to the tape medium at a second frequency that is lower than the first frequency.

Yet another general embodiment includes a tape medium for recording information, the tape medium including a first region to which data is recorded at a first frequency; and a second region to which identification information, used by an apparatus for processing the data to identify the data, is recorded at a second frequency that is lower than the first frequency.

Hereinafter, illustrative and nonlimiting best modes for carrying out various aspects of the present invention (hereinbelow referred to as "embodiment" or "embodiments") will be described in detail with reference to the accompanying drawings. It should be understood that this is done by way of example only and should not be construed as limiting.

FIG. 1 is a diagram showing an exemplar configuration of a tape drive 10 to which the present embodiment is applied. The tape drive 10 includes an interface 11, a buffer 12, a channel 13, a head 14, and a motor 15. The tape drive 10 also includes a controller 16, a head position control system 17, and a motor driver 18. Moreover, since a tape cartridge 20 can be loaded to the tape drive 10 by insertion, the tape cartridge 20 is also illustrated herein. The tape cartridge 20 includes a tape 23 wound around reels 21 and 22. The tape 23 moves in a longitudinal direction from the reel 21 to the reel 22 or from the reel 22 to the reel 21, along with the rotation of the reels 21 and 22. Incidentally, although a magnetic tape is used as an example of the tape 23, tape mediums other than the magnetic tape may also be used.

Among these components, the interface 11 communicates with a host 30 which is an example of an upper-level apparatus. Such host 30 may be a computing device locally connected to the tape drive 10, coupled thereto via a network, etc. Illustrative upper-level apparatuses include personal computers, network servers, storage controllers or servers, networked computers, etc.

Continuing with the host 30 example, for instance, the interface 11 receives, from the host 30, a command for instructing the writing of data to the tape 23, a command for moving the tape 23 to a target position, and a command for instructing the reading of data from the tape 23. Note that SCSI is employed as an example of the communication standard used for the interface 11. In the case of SCSI, a first command corresponds to a Write command, a second command corresponds to a Locate command or a Space command, and a third command corresponds to a Read command. In addition, the interface 11 returns, to the host 30, a response on whether each of the processes corresponding to these commands succeeds or fails.

The buffer 12 is a memory for storing data to be written to the tape 23 and for storing data read from the tape 23, and is configured of a DRAM (dynamic random access memory), for example. Moreover, the buffer 12 is configured of multiple buffer segments, and each buffer segment stores a data set which is the unit for writing and reading to and from the tape 23.

The channel 13 is a communication path used for transmitting, to the head 14, data to be written to the tape 23 and for receiving, from the head 14, data read from the tape 23.

The head 14 writes information to the tape 23 and reads information from the tape 23, with the movement of the tape 23 in the longitudinal direction.

The motor 15 rotates the reels 21 and 22. Note that although a single rectangle is illustrated as the motor 15 in FIG. 1, the motor 15 is preferably provided for each of the reels 21 and 22, in other words, a total of two motors 15 are preferably provided therefor.

Meanwhile, the controller 16 controls the entire tape drive 10. For instance, the controller 16 performs control to write data to the tape 23 or to read data from the tape 23, according to a command received by the interface 11. The controller 16 also controls the head position control system 17 and the motor driver 18.

The head position control system 17 is a system for tracing one or multiple desired wraps. Here, a wrap refers to a group formed by multiple tracks on the tape 23. When a wrap needs to be switched, the head 14 also needs to be switched electrically, and thus the head position control system 17 controls this switching.

The motor driver 18 drives the motor 15. Incidentally, in the case of using two motors 15 as mentioned above, two motor drivers 18 are also provided therefor.

Firstly, a brief overview of the present embodiment will be given.

The present embodiment makes it possible to read data even when running the tape 23 at high speed. To this end, related data (hereinafter referred to as "metadata") used by the host 30 to specify a target user data is recorded to the tape 23, in addition to meaningful data for the user (hereinafter referred to as "user data"). In this respect, the recording density of metadata needs to be low. This is because if the recording density thereof is high, the data cannot be read when the tape is run at high speed. In addition, it suffices that metadata is data which can specify the target user data. Accordingly, metadata may be data such as a record number, which does not require a large data amount, and may be of a low recording density.

Thus, in the present embodiment, metadata is recorded with a lower recording density than that of user data. For example, the recording density of metadata is set to be approximately the same as that of a servo pattern recorded in advance in the tape 23. Here, "approximately the same" means that metadata can be read in approximately the same extent as a servo pattern when the tape 23 is run at high speed. To be specific, metadata is preferably recorded by use of the same recording scheme used for a servo pattern, that is, the same encoding scheme is employed with a similarly low frequency. With this configuration, signals can be detected and encoded in the same manner as servo patterns, even when the tape 23 is run at such high speed that user data cannot be encoded.

As has been described above, user data and metadata are recorded by use of different recording schemes.

Accordingly, in the present embodiment, dedicated tracks for recording metadata (hereinafter referred to as "metadata tracks") are firstly provided on the tape 23, in addition to tracks for recording user data (hereinafter referred to as "user data tracks") Incidentally, the metadata tracks are also required for the number of wraps.

In addition, a dedicated writing and reading head for recording metadata (hereinafter referred to as "metadata head") is provided, in addition to a writing and reading head for recording user data (hereinafter referred to as "user data head"). Note that as a specific implementation of the head, the metadata head may be incorporated into the head 14, which is a head assembly including the user data head and a servo head.

Hereinbelow, a description will be given of a format of the tape 23 to which metadata tracks are provided.

Figure 2:
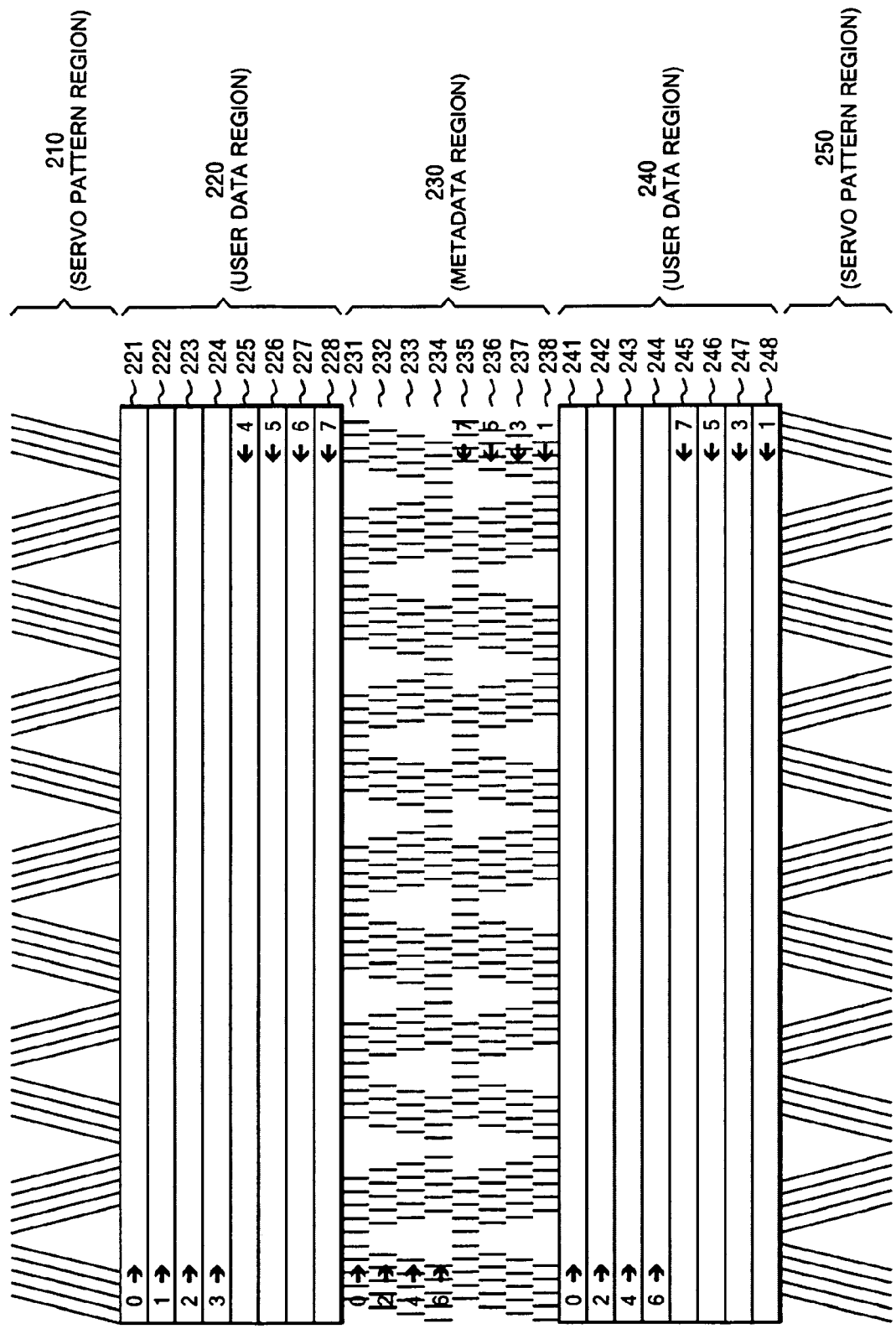
FIG. 2 is a diagram showing an exemplar format of a tape to which data is recorded by an embodiment of the present invention.

FIG. 2 is a diagram showing an example of such a format. For the purpose of simplification of the diagram, FIG. 2 shows a format in which one wrap is configured of two user data tracks, and user data is recorded in eight wraps. In FIG. 2, one metadata track is added between the two user data tracks, for each wrap. It should be noted that in the case where one wrap is configured of three or more user data tracks, the following determinations can be made arbitrarily because such determinations are not limited in the present invention: between which user data tracks should the metadata track be added; and how many metadata tracks should be added.

A detailed description of the format in FIG. 2 will be given below.

As shown in FIG. 2, a servo pattern region 210, a user data region 220, a metadata region 230, a user data region 240, and a servo pattern region 250 are arranged on the tape 23 in this order transversely on the tape 23.

Among these regions, the servo pattern regions 210 and 250 are regions each of which includes a servo pattern in which LPOS indicating a physical position on the tape 23 is embedded. The servo pattern is recorded prior to shipment of the tape 23, and is also used to detect the head position (positioning of track), to detect a tape speed, and the like.

The user data regions 220 and 240 are regions for recording user data. Since user data is recorded in eight wraps in this example, the user data region 220 includes eight user data tracks (user data tracks 221, 222, ..., 228). The user data region 240 similarly includes eight user data tracks (user data tracks 241, 242, ..., 248).

Meanwhile, the metadata region 230 is a region for recording metadata. Since metadata is recorded in eight wraps in this example, the metadata region 230 includes eight metadata tracks (metadata tracks 231, 232, ..., 238).

It should be noted that in FIG. 2, the number and the arrow assigned to each user data track or each metadata track respectively indicates the wrap number including the track, and the recording direction of user data or metadata in the wrap. Specifically, wrap 0 includes the user data track 221, the metadata track 231, and the user data track 241. Here, user data is recorded to the user data tracks 221 and 241 with the user data head from left to right, and metadata is recorded to the metadata track 231 with the metadata head from left to right. Similar operations are carried out for the other wraps 1 to 7.

Incidentally, one wrap is configured of eight tracks in first and second generation LTO tapes, and sixteen tracks in third and fourth generation LTO tapes. Moreover, the number of tracks may increase in the future. Meanwhile, it suffices that a single metadata track is added for one wrap. Hence, the ratio of a required area for metadata tracks relative to the whole area is 1/25 if the number of tracks increases to 24, and 1/33 if the number of tracks increases to 32. As has been described, only a small area is required to arrange metadata tracks.

Next, a detailed description will be given of the controller 16 in the tape drive 10, which carries out processing for writing and reading data to and from the tape 23 in the format as shown in FIG. 2. Note that the SCSI command is used as an example in the present embodiment. Additionally, the present embodiment will be described by using the linear-tape open (LTO) standard as an example. Accordingly, the terms used herein also conform to the LTO standard, such as "data set" referring to a group of data stored in one segment in the buffer 12.

Firstly, a functional configuration of the controller 16 will be described.

Figure 3:
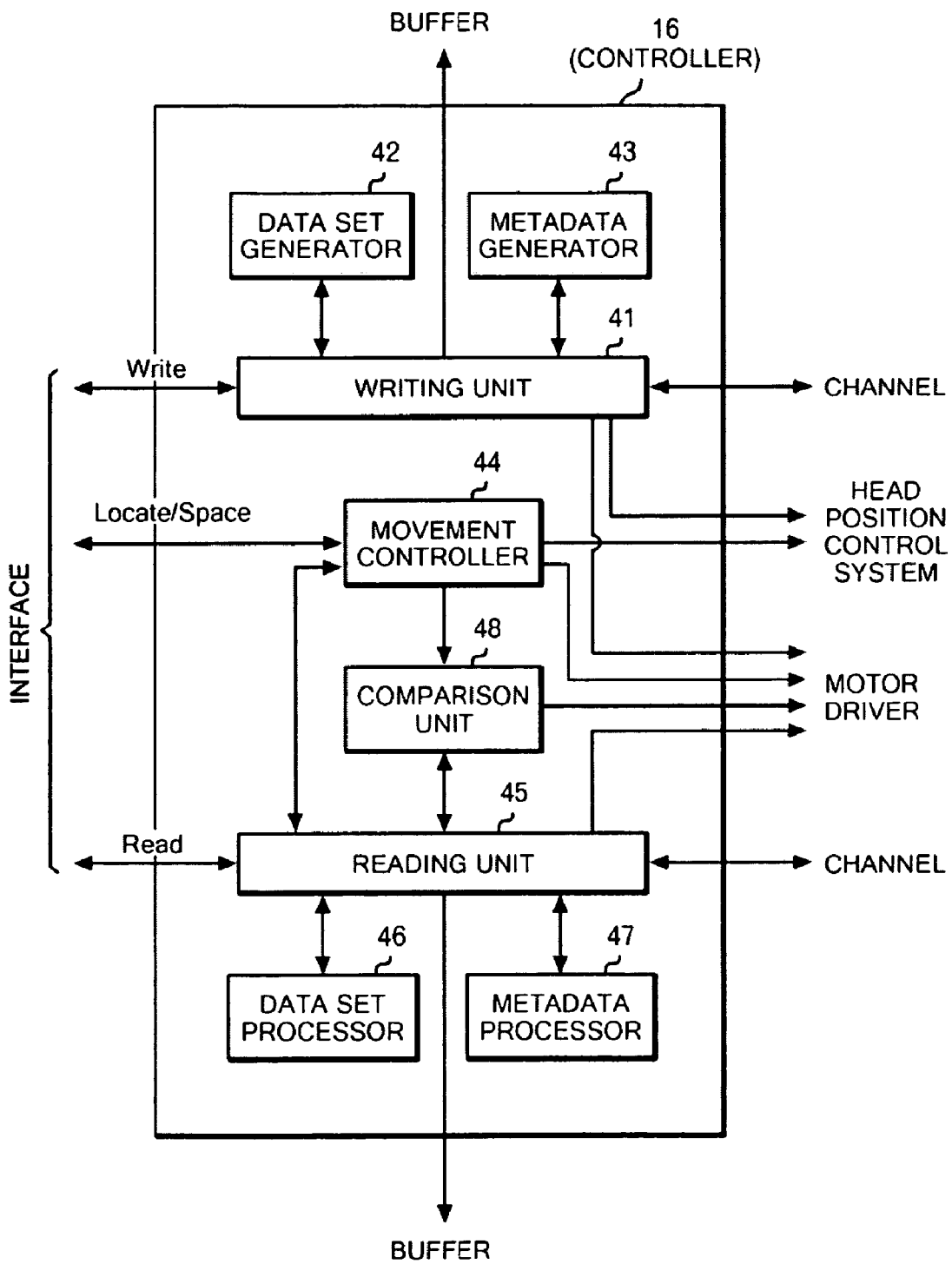
FIG. 3 is a block diagram showing a functional configuration example of a controller of an embodiment of the present invention.

FIG. 3 is a block diagram showing a functional configuration example of the controller 16.

As shown in FIG. 3, the controller 16 includes a writing unit 41, a data set generator 42, and a metadata generator 43. The controller 16 also includes a movement controller 44, a reading unit 45, a data set processor 46, a metadata processor 47, and a comparison unit 48. Illustrative units include a processor or processors executing discrete or integrated software or firmware, logic; application specific integrated circuits; reconfigurable hardware; etc. For example, some or all of the foregoing units may be portions of a common processor processing discrete instruction sets and/or different portions of a common instruction set, e.g., firmware, software, logic, etc.

Among these components, the writing unit 41 receives a record, which is instructed by the host 30 through a Write command to be written to the tape 23. Here, a record is an example of data designated by an upper-level apparatus. The writing unit 41 may also store a data set generated by the data set generator 42 and metadata generated by the metadata generator 43 to the buffer 12, and then output the two at a predetermined timing to the channel 13 so that the data can be written to the tape 23.

The data set generator 42 generates a data set to be written to the user data region of the tape 23, according to an instruction from the writing unit 41. In a particularly preferred approach, the data set generator 42 compresses a record which is instructed by the host 30 through a Write command to be written to the tape 23, generates user data configured of multiple records, and writes the data to a data set. The data set generator also generates a data set information table (hereinafter referred to as "DSIT"), and writes the table to the data set. Then, the writing unit 41 performs error correction encoding on the data set, and obtains the data set to be written to the tape 23. In the present embodiment, the data set generator 42 is provided as an example of a first obtaining unit for obtaining data.

The metadata generator 43 generates metadata to be written to the metadata region of the tape 23, according to an instruction from the writing unit 41. To be specific, the metadata generator 43 receives the DSIT generated by the data set generator 42 through the writing unit 41, and generates metadata on the basis of the DSIT. Then, the metadata generator 43 performs error correction encoding on the metadata, and obtains the metadata to be written to the tape 23. In the present embodiment, metadata is used as an example of identification information for an upper-level apparatus to identify data, and the metadata generator 43 is provided as an example of a second obtaining unit for obtaining the identification information.

Meanwhile, upon receipt of an instruction, through a Locate command or a Space command from the host 30, to move the tape 23 to a position in which a record of a certain record number is recorded, the movement controller 44 forwards the record number to the comparison unit 48 as well as starts to run the tape 23. In the present embodiment, the movement controller 44 is provided as an example of an obtaining unit for obtaining identification information of specific data designated by the upper-level apparatus.

The reading unit 45 receives a data set or metadata read from the tape 23, through the channel 13. The reading unit 45 also carries out operations such as forwarding the number of records and the like forwarded from the metadata processor 47 to the comparison unit 48. Moreover, if the target record is included in the read data set, the reading unit 45 stores the data set including the target record to the buffer 12. Thereafter, upon receipt of a read command from the host 30, the reading unit 45 returns the record as a response to the host 30.

In accordance with an instruction from the reading unit 45, the data set processor 46 reconstructs user data and DSIT on the basis of the data set read from the tape 23. Specifically, the data set processor 46 performs error correction decoding on the data set read from the tape 23, and obtains user data and DSIT.

In accordance with an instruction from the reading unit 45, the metadata processor 47 reconstructs the metadata before encoding on the basis of the metadata read from the tape 23. Specifically, the metadata processor 47 performs error correction decoding on the metadata read from the tape 23, and obtains the metadata before encoding. The metadata processor 47 also extracts the number of records and the like from the reconstructed metadata.

The comparison unit 48 compares a record number forwarded from the movement controller 44, and the number of records and the like forwarded from the reading unit 45. Then, the comparison unit 48 determines whether the record number forwarded from the movement controller 44 is included in the at least one record number specified by the number of records and the like forwarded from the reading unit 45. If the record number is included, the comparison unit 48 changes the speed of the tape 23 so that the data set can be read. In the present embodiment, the comparison unit 48 is provided as an example of a determination unit for determining whether or not to read the specific data designated by the upper-level apparatus.

Next, a detailed description will be given of an operation of the controller 16.

Upon receipt of a Write command from the host 30, the controller 16 writes a signal (metadata) in which a record number is embedded to a certain track by use of the metadata head. Incidentally, since small records may consecutively appear in some cases, the record number does not need to be assigned to every one of the records. The record number may be assigned to only a part of the records, as long as the data set including the target record can be specified. In the following description, the record number of a record included in a data set is specified by use of the number of records to the data set, the number of records in the data set, and the like.

Hereinafter, the operation of the controller 16 at this time will be described in further detail.

Figure 4:
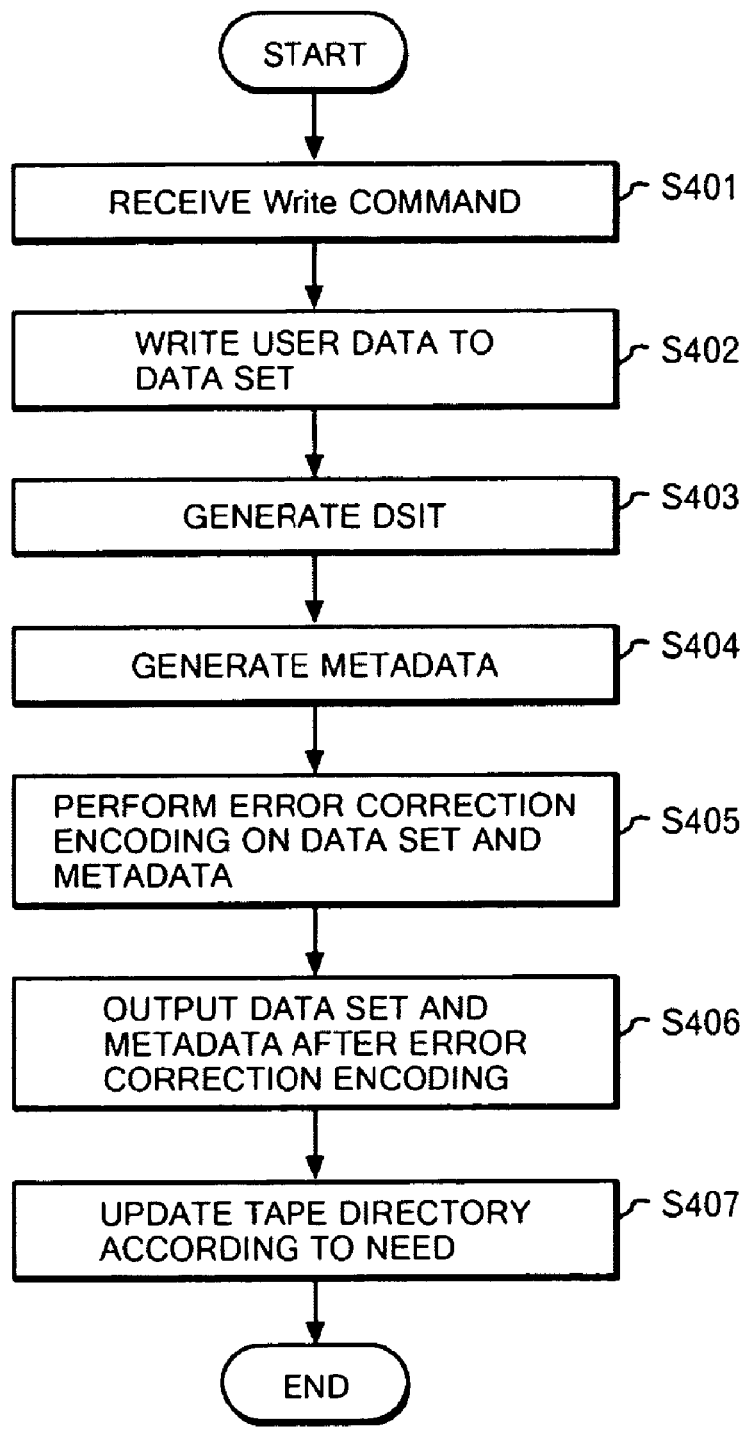
FIG. 4 is a flowchart showing an operation example of a controller of an embodiment of the present invention at the time of writing data.

FIG. 4 is a flowchart showing operations of the writing unit 41, the data set generator 42, and the metadata generator 43. When a Write command is transmitted from the host 30 to the tape drive 10, the writing unit 41 receives a record designated by this command in the tape drive 10 (step 401). Then, the writing unit 41 instructs the data set generator 42 to generate a data set.

Upon receipt of the instruction, the data set generator 42 compresses the record, and writes user data configured of multiple records to a data set (step 402). The data set generator 42 also generates and writes a DSIT to the data set (step 403). Specific information content included in the DSIT will be described later. Additionally, the data set generator 42 returns at least the DSIT to the writing unit 41.

Next, the writing unit 41 forwards the DSIT forwarded from the data set generator 42 to the metadata generator 43, and issues an instruction to generate metadata.

Upon receipt of the instruction, the metadata generator 43 generates metadata on the basis of the DSIT (step 404). The metadata generator 43 also transmits a response indicating completion of metadata generation, to the writing unit 41.

With this response, the writing unit 41 instructs the data set generator 42 to perform error correction encoding on the data set, and instructs the metadata generator to perform error correction encoding on the metadata (step 405). Upon receipt of the instruction, the data set generator 42 performs error correction encoding on the data set to generate the data set to be written to the tape 23, and forwards the data set to the writing unit 41. Similarly, the metadata generator 43 performs error correction encoding on the metadata to generate metadata to be written to the tape 23, and forwards the metadata to the writing unit 41.

Then, upon receipt of the data set and metadata to be written to the tape 23, the writing unit 41 outputs the data set and metadata to the channel 13 so that they may be synchronized and written to corresponding positions in the longitudinal direction of the user data region and the metadata region, respectively (step 406). Thereafter, the data set is subjected to DA conversion and written to the user data track by the user data head. Note that in the case where a wrap is configured of multiple tracks, the data set is divided into multiple parts corresponding to the number of tracks, and each part is written to each track by a user data head provided to each track. The metadata is similarly subjected to DA conversion and written to the metadata track by the metadata head.

If the data set and metadata are written normally, the writing unit 41 receives a report of the writing through the channel 13, and updates a cartridge memory according to need (step 407). Specific information stored in the cartridge memory will be described later.

A detailed description will be given of the DSIT generated in step 403.

A DSIT is configured of 480 bytes, and includes information on a given data set such as a data set number, records included in the data set, the number of filemarks, and the like. Here, a data set number is a sequence number assigned sequentially from the beginning of the tape 23, to the data sets written to the tape 23.

Among the information stored in the DSIT, in order for execution of the later-described Locate command, the following types of information will be used in this embodiment.

The number of records included in the data set (Rec Cnt)

The number of filemarks included in the data set (FM Cnt)

The number of records recorded from the beginning of the tape to the data set (Total Rec)

The number of filemarks recorded from the beginning of the tape to the data set (Total FM)

A write pass indicating the validity of the data set (Write Pass)

It should be noted that a write pass is used to indicate the newest data set, because data sets having the same data set number are repeatedly written to the tape. In other words, the data set having the largest write pass is the valid data set.

Among the five types of information, each of Total Rec and Total FM is configured of 6 bytes, and each of the other types of information is configured of 4 bytes. Accordingly, a data set can be located at high speed by writing, as metadata, only information configured of 24 bytes (=6 bytes×2+4 bytes×3) among the information stored in the DSIT, to the tape.

As the scheme for writing metadata, a scheme of writing a single piece of metadata for a single data set (hereinafter referred to as "1 to 1 scheme"), and a scheme of writing a single piece of metadata for N data sets (hereinafter referred to as "N to 1 scheme") may be assumed.

The 1 to 1 scheme is employed in the case where the data amount of metadata is sufficiently smaller than that of the data set, that is, the case where the length of metadata in the tape movement direction can be kept short relative to the length of the data set in the same direction, when writing necessary information as metadata.

Meanwhile, the N to 1 scheme is employed in the case where the data amount of metadata is larger than that of the data set, that is, the case where the length of metadata in the tape movement direction exceeds the length of the data set in the same direction, when writing necessary information as metadata.

Figure 5:
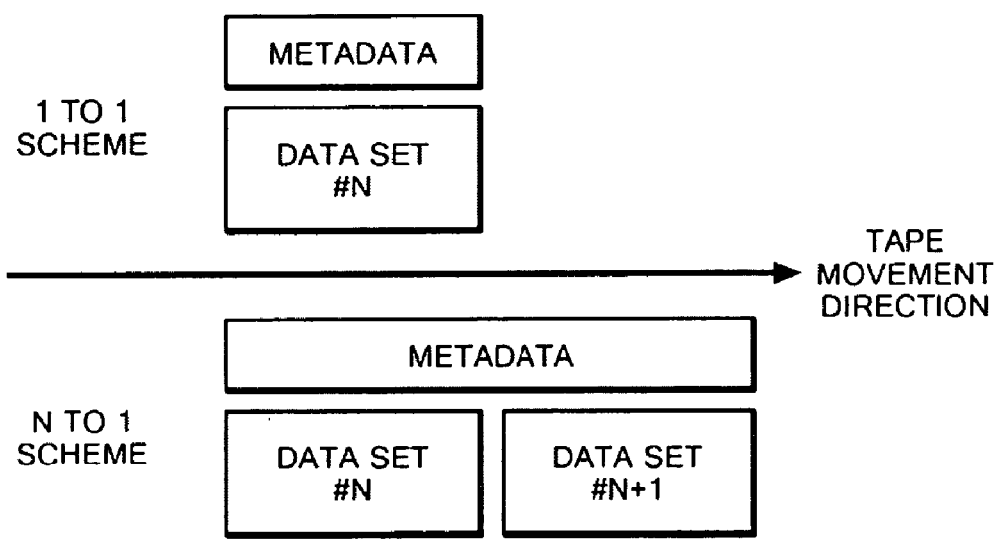
FIG. 5 is a diagram for describing a recording scheme for a data set and metadata in an embodiment of the present invention.

FIG. 5 is a diagram illustrating a comparison between the 1 to 1 scheme and the N to 1 scheme.

In the case of the 1 to 1 scheme, the length of metadata in the tape movement direction is recorded so as to be within the length of a data set #N in the same direction.

In the case of the N to 1 scheme, the length of metadata in the tape movement direction exceeds the length of the data set #N in the same direction, and is also recorded in the position corresponding to a data set N+1, for example.

A more detailed description of the 1 to 1 scheme will be given below.

In third generation LTO tapes, for example, a servo pattern is 36 bit data, and a data set is recorded in correspondence to approximately 15 servo patterns.

Accordingly, 67.5 bytes (=36 bits×15/8) of information can be written to metadata corresponding to a data set As has been described, the information amount required to specify a record while running a tape at high speed is 24 bytes. Hence, only 24 bytes out of 67.5 bytes is necessary for the high speed movement of the tape. The remaining part may be used as the redundant part for error correction, or may be used otherwise.

A description of the N to 1 scheme will be given below.

When writing metadata by use of a recording scheme different from the servo pattern, in some cases, data for 24 bytes cannot be written in a position corresponding to a single data set. In such a case, a single piece of metadata is written for every two data set. The N to 1 scheme shown in FIG. 5 illustrates an example of such a case, where a single piece of metadata is recorded for two data sets.

Incidentally, the determination on which of the 1 to 1 scheme or the N to 1 scheme to employ, is generally made in a stage where the format (spec) of the tape 23 is determined. Then, the result of the determination is stored in an unillustrated memory in the controller 16, for example. With this configuration, the writing unit 41 may generate and write metadata according to need, if information indicating that the N to 1 scheme is employed is stored in the memory. To be specific, after step 403 in FIG. 4, a determination is made on whether to write the metadata by use of the 1 to 1 scheme or the N to 1 scheme. If it is determined that metadata is to be written by use of the 1 to 1 scheme, all of the processes in steps 404 to 406 are carried out. Meanwhile, if it is determined that metadata is to be written by use of the N to 1 scheme, the processes related to metadata in steps 404, 405 and 406 are carried out according to need.

Next, a description will be given of the content of the tape directory stored in step 407.

FIG. 6 shows a concrete example of the content of a tape directory.

A tape directory is information for managing the number of records recorded in physical positions in a tape. Specifically as shown in FIG. 6, a tape directory manages, for each wrap, a last data set number in the wrap, the number of records included in the first half of the wrap, the number of filemarks included in the first half of the wrap, the number of records included in the latter half of the wrap, and the number of filemarks included in the latter half of the wrap.

In the present embodiment, only an operation for writing a record transmitted from the host 30 has been described. However, elimination of old information along with the writing operation may be desired in some cases. In such a case, a method of superimposing metadata signals on a high-frequency transmission wave, or a method of incorporating an erase head into the head assembly may be employed.

Moreover, in the case of recording metadata in synchronization with a servo pattern, the metadata may be used to backup detection of a head position or a tape speed by the servo pattern, when a Read command, a Space command, or a Locate command is received.

Upon receipt of a Locate command or a Space command from the host 30, the controller 16 carries out the following operation.

That is, the controller 16 searches the wrap to which the target data is recorded, from the tape directory. Then, the controller 16 moves the head to the wrap including the target data, and runs the tape toward the position in which the target data is recorded.

Here, two cases may be assumed depending on the position before starting the tape movement: a case where the record number increases along with the movement of the tape 23; and a case where the record number decreases. In other words, there are cases where the tape is run in the forward writing and reading direction, and where the tape is run in the reverse direction. However, use of the above error correction encoding enables decoding in both cases.

Thereafter, on reaching the recorded position of the target data, or immediately before reaching the position, the controller 16 switches the operation to the last process of the conventional Space or Locate operation.

Similarly, in the case where metadata cannot be used for some reason, the controller 16 switches the operation to the conventional Space or Locate operation.

A detailed description of the operation of the controller 16 will be given below.

Figure 7:
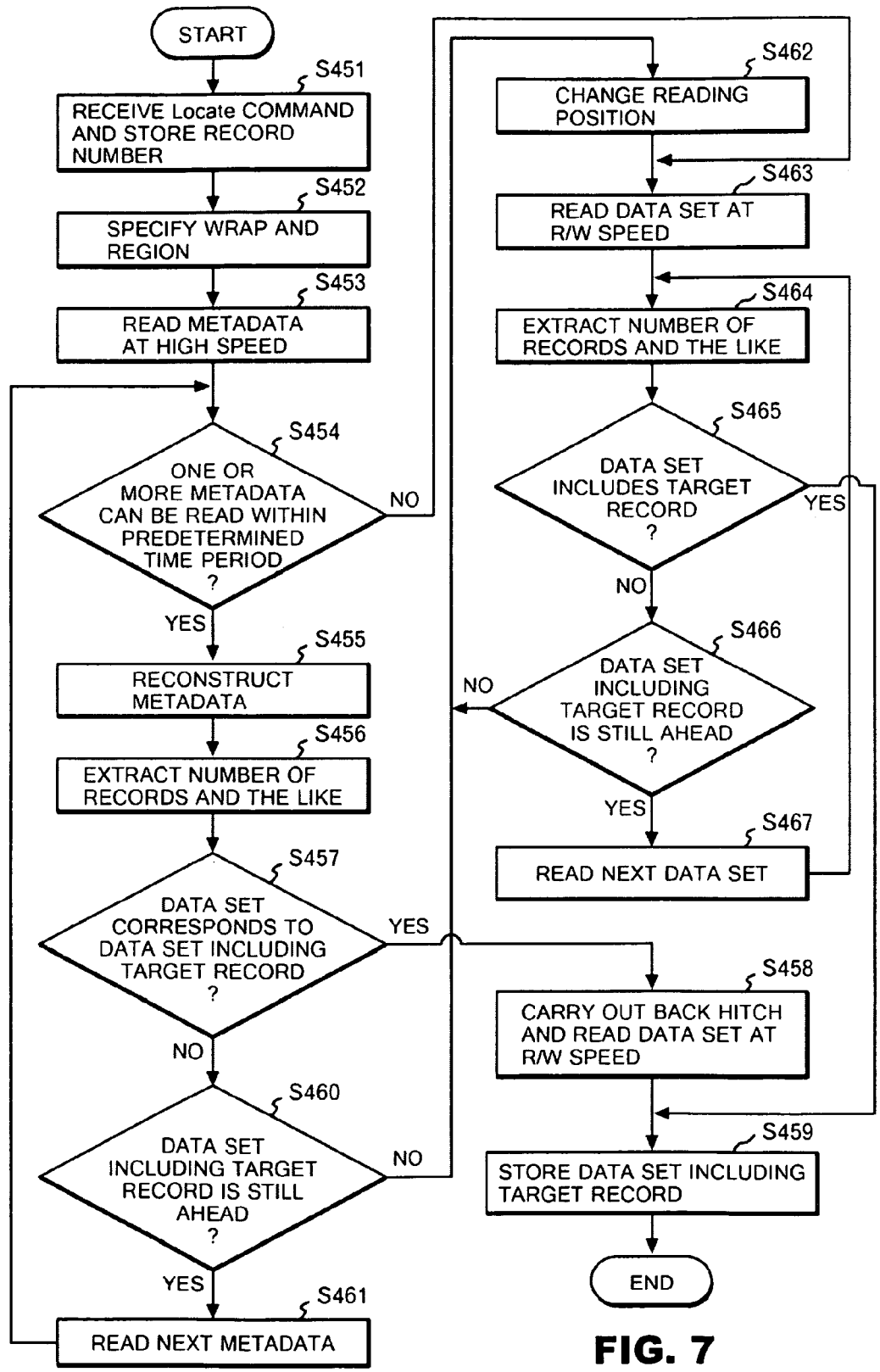
FIG. 7 is a flowchart showing an operation example of the controller of an embodiment of the present invention at the time of writing data.

FIG. 7 is a flowchart showing the operations of the movement controller 44, the reading unit 45, the data set processor 46, the metadata processor 47, and the comparison unit 48. Note that the Locate command is used from among the Locate command and the Space command, as an example in the description. Additionally, in the flowchart, the tape 23 is run in the direction in which the recorded record number or the like increases.

When a Locate command is transmitted from the host 30 to the tape drive 10, the movement controller 44 of the tape drive 10 receives the record number designated by the command, and forwards the record number to the comparison unit 48 (step 451). Upon receipt of the record number, the comparison unit 48 stores the record number. Then, the movement controller 44 specifies the wrap and region in which the data set including the record of the record number is recorded (step 452). Here, the wrap and region is specified by use of the tape directory in the cartridge memory, stored in step 407 of FIG. 4. By using the tape directory, the movement controller 44 determines which region (first half or latter half) of which wrap the record of the record number received from the host 30 is stored. For instance, assume that values as shown in FIG. 6 are stored in the tape directory. In this case, if the target position (total of number of records and number of filemarks) designated by the Locate command is 2000, the movement controller 44 determines that the target position is in the latter half of wrap 0. If the target position is 4000, the movement controller 44 determines that the target position is in the first half of wrap 1.

After thus specifying the wrap and region, the movement controller 44 outputs signals to the head position control system 17 and the motor driver 18 so that metadata can be read at high speed from the beginning of the specified region of the specified wrap. Here, the running speed of the tape 23 is preferably set to 12 m/sec, for example. If the target position is in the latter half of wrap 0 as mentioned above, for example, the movement controller 44 transmits a signal to the head position control system 17 for adjusting the head position to wrap 0, and transmits a signal to the motor driver 18 for running the tape 23 from the middle at high speed. Note that at this time, the movement controller 44 notifies the reading unit 45 that the tape 23 is run at high speed.

Thus, a data set and metadata are transmitted respectively from the user data head and the metadata head to the reading unit 45. However, since the reading unit 45 is notified by the movement controller 44 that the tape 23 is run at high speed, the reading unit 45 receives only the metadata (step 453).

Then, the reading unit 45 determines whether one or more metadata can be read within a predetermined period of time (step 454).

As a result, if the reading unit 45 determines that one or more metadata cannot be read within a predetermined period of time, the reading unit 45 lowers the speed of the tape 23 to a speed for reading and writing data (hereinafter referred to as "R/W speed"), and searches the target record by use of a conventional method. The conventional method will be described later.

Meanwhile, if the reading unit 45 determines that one or more metadata can be read within a predetermined period of time, the reading unit 45 instructs the metadata processor 47 to reconstruct metadata before encoding, from the metadata recorded to the tape 23. Upon receipt of the instruction, the metadata processor 47 reconstructs the metadata before encoding (step 455). The metadata processor 47 also extracts, from the metadata, a part of information in the DSIT such as the number of records to the data set (Total Rec), the number of records in the data set (Rec Cnt), the number of filemarks to the data set (Total FM), and the number of filemarks in the data set (FM Cnt). The metadata processor 47 then forwards the extracted information to the reading unit 45 (step 456). Thereafter, the reading unit 45 forwards the information to the comparison unit 48.

Upon receipt of the information, the comparison unit 48 checks whether the record number forwarded from the movement controller 44 (Target Block) is included in the record numbers specified by the number of records and the like forwarded from the reading unit 45 (step 457). To be specific, the comparison unit 48 compares the values of "Total Rec+Total FM", "Target Block", and "Total Rec+Rec Cnt+Total FM+FM Cnt".

If the record number forwarded from the movement controller 44 is included in the record numbers specified by the number of records and the like forwarded from the reading unit 45, that is, if both (Target Block<Total Rec+Rec Cnt+Total FM+FM Cnt) and (Target Block>Total Rec+Total FM) are true, the comparison unit 48 carries out the following operation. Specifically, the comparison unit 48 carries out a backhitch on the motor 18, and transmits a signal instructing the motor 18 to lower the tape speed to R/W speed such as 6 m/sec, for example. Note that at this time, the comparison unit 48 notifies the reading unit 45 that the tape 23 is run at R/W speed. Thus, a data set and metadata are transmitted respectively from the user data head and the metadata head to the reading unit 45. However, since the reading unit 45 is notified by the comparison unit 48 that the tape 23 is run at R/W speed, the reading unit 45 receives the data set (step 458). Then, the reading unit 45 performs positioning of a record or a filemark in the data set (step 459). In other words, the reading unit stores the data set including the target record or filemark to the buffer 12, so that the target record can be transmitted when a Read command is transmitted from the host 30. Finally, the reading unit 45 reports completion of the Locate command to the host 30.

Note that in this description, the data set corresponding to metadata read by the reading unit 45 is determined to be the data set including the target record, when the record number forwarded from the movement controller 44 is included in the record numbers specified by the number of records and the like forwarded from the reading unit 45. However, there may be a case as mentioned above where the same data set is repeatedly written, due to a failure or the like in writing the data set. Hence, in the case where metadata includes a write pass, the validity of a data set corresponding to the metadata read by the reading unit 45 may be determined by use of a write pass.

Meanwhile, if the record number forwarded from the movement controller 44 is not included in the data set corresponding to the metadata read by the reading unit 45, that is, if both (Target Block<Total Rec+Rec Cnt+Total FM+FM Cnt) and (Target Block>Total Rec+Total FM) are not true, the comparison unit 48 carries out the following operation. Specifically, the comparison unit 48 determines whether the data set including the record of the record number forwarded from the movement controller 44 is recorded to a position on the tape 23 before the data set corresponding to the metadata read by the reading unit 45 (step 460). If the comparison unit 48 determines "yes" in step 460, that is, if (Target Block>Total Rec+Rec Cnt+Total FM+FM Cnt) is true, the reading unit 45 reads the next metadata (step 461), and repeats the processing from step 454 for the read metadata. If the comparison unit 48 determines "no" in step 460, that is, if (Target Block<Total Rec+Total FM) is true, the reading unit 45 has failed in obtaining metadata, and thus moves back the initiating position a little for reading (step 462), lowers the speed of the tape 23, and searches the target record by use of a conventional method.

Here, a description will be given of the conventional method for searching a target record.

Firstly, the reading unit 45 reads a data set at R/W speed (step 463). Then, the reading unit 45 extracts, from the DSIT, the number of records to the data set (Total Rec), the number of records in the data set (Rec Cnt), the number of filemarks to the data set (Total FM), the number of filemarks in the data set (FM Cnt) and the like, and forwards the information to the comparison unit 48 (step 464).

Upon receipt of the information, the comparison unit 48 checks whether a record number (Target Block) forwarded from the movement controller 44 is included in the record numbers specified by the number of records and the like forwarded from the reading unit 45 (step 465). To be specific, the comparison unit 48 compares the values of "Total Rec+Total FM", "Target Block", and "Total Rec+Rec Cnt+Total FM+FM Cnt".

If the record number forwarded from the movement controller 44 is included in the record numbers specified by the number of records and the like forwarded from the reading unit 45, that is, if both (Target Block<Total Rec+Rec Cnt+Total FM+FM Cnt) and (Target Block>Total Rec+Total FM) are true, the comparison unit 48 reports the fact to the reading unit 45. Then, the reading unit 45 reads the target record from the read data set, and stores the record to the buffer 12 (step 459).

Meanwhile, if the record number forwarded from the movement controller 44 is not included in the data set read by the reading unit 45, that is, if both (Target Block<Total Rec+Rec Cnt+Total FM+FM Cnt) and (Target Block>Total Rec+Total FM) are not true, the comparison unit 48 carries out the following operation. Specifically, the comparison unit 48 determines whether the data set including the record of the record number forwarded from the movement controller 44 is recorded to a position on the tape 23 after the data set corresponding to the metadata read by the reading unit 45 (step 466). If the comparison unit 48 determines "yes" in step 466, that is, if (Target Block>Total Rec+Rec Cnt+Total FM+FM Cnt) is true, the reading unit 45 reads the next data set (step 467), and repeats the processing from step 464 for the read data set. If the comparison unit 48 determines "no" in step 466, that is, if (Target Block<Total Rec+Total FM) is true, the reading unit 45 has failed in obtaining the data set, and thus moves back the initiating position a little for reading (step 462), and repeats the processing from step 463.

Incidentally, the flowchart has been described for the case where the tape 23 is run in a direction in which the recorded record number and the like increases, when searching for the target record. However, the tape 23 may otherwise be run in the direction in which the recorded record number and the like decreases. In such a case, if (Target Block<Total Rec+Total FM) is true in step 460 the processing proceeds to step 461, and if (Target Block>Total Rec+Rec Cnt+Total FM+FM Cnt) is true the processing proceeds to step 462. Meanwhile, if (Target Block<Total Rec+Total FM) is true in step 466 the processing proceeds to step 467, and if (Target Block>Total Rec+Rec Cnt+Total FM+FM Cnt) is true the processing proceeds to step 462.

Note that in the above description, user data and corresponding metadata are recorded at positions that may be overlapped with each other transversely on the tape 23. However, the relationship between the recording positions of user data and metadata is not limited to this. In other words, any positions may be employed, as long as the positions are associated in advance with each other, so that the recording position of user data can be specified by use of the recording position of metadata.

Instead of recording user data and metadata in different positions, the two may be recorded so as to be superimposed on each other by use of the frequencies thereof.

In this case, data is written in the following manner, for example.

Firstly, user data of a high frequency and metadata of a low frequency are added together. Then, the resultant data signal is written by use of a single writing head.

Meanwhile, data is read in the following manner, for example.

Firstly, a reading head reads a data signal in which user data and metadata are superimposed on each other. Then, the data signal is passed through a high pass filter to extract user data, and the same data signal is passed through a low pass filter to extract metadata.

Incidentally, the above addition may be performed on an electronic circuit. Otherwise, making use of the characteristic that a low-frequency signal is recorded to a deep part of a magnetic layer while a high-frequency signal is recorded to a shallow part of a magnetic layer, the two may be added on a magnetic layer by use of two writing heads.

In addition, a single track or multiple tracks may be employed as the track on which to record user data and metadata superimposed on each other by use of the frequencies thereof. In the case of employing multiple tracks, the same metadata may be recorded to the tracks in order to have redundancy, or different metadata may be recorded to each track in order to increase the upper limit amount of recordable metadata.

Moreover, a system may be configured by employing both schemes of the superimposing of user data and metadata by use of frequencies thereof, and the dedicated tracks for metadata.

Hence, in the present embodiment, metadata (a record number, for example) is recorded to the tape 23 so as to be readable at a higher speed than user data. As a result, not only the LPOS but also the record number can be detected continuously when the tape 23 is run at high speed. Accordingly, performance deterioration can be avoided when a Space command or a Locate command is executed, which deterioration caused by error estimation by use of linear interpolation or the like. Additionally, since the tape 23 can be run at high speed to a point immediately before the target data, performance of a Space command or a Locate command can be improved.

The present invention may be implemented entirely as hardware, or entirely as software. Otherwise, the present invention may be implemented as a combination of hardware and software. The present invention may also be implemented as a computer, a data processing system, or a computer program. The computer program may be provided by being recorded to a computer readable medium. Here, assumable media are an electronic medium, a magnetic medium, an optical medium, an electromagnetic medium, an infrared or semiconductor system (apparatus or device), and a propagation medium. In addition, as a computer readable medium, a semiconductor, a solid state storage device, a magnetic tape, a removable computer diskette, a random access memory (RAM), a read only memory (ROM), a ridged magnetic disk, and an optical disk are assumable. Current examples of the optical disk include a compact disk read only memory (CD-ROM), a compact disk read/write (CD-R/W) and a DVD.

By employing some embodiments of the present invention, the possibility of specifying a recorded position of designated data can be enhanced, even when a tape medium is run at high speed.

Hereinabove, the present invention has been described by use of various embodiments. However, the technical scope of the present invention is not limited to the above embodiments, and it should be understood that various changes, substitutions and scope of the invention may be made. It is obvious to those skilled in the art that various modifications and alternative modes can be made without departing from the spirit and scope of the present invention.

What is claimed is:

1. An apparatus for writing data designated by an upper-level apparatus to a tape medium, comprising:
   a first obtaining unit for obtaining the data designated by the upper-level apparatus;
   a second obtaining unit for obtaining identification information used by the upper-level apparatus to identify the data obtained by the first obtaining unit; and
   a writing unit for writing the data obtained by the first obtaining unit to the tape medium at a first frequency, and writing the identification information obtained by the second obtaining unit to the tape medium at a second frequency that is lower than the first frequency, the identification information being written to a first region of the tape medium that is laterally displaced from a second region of the tape medium to which the data is written, the lateral displacement being in a direction perpendicular to a length of the tape medium.

2. The apparatus according to claim 1, wherein the second region is associated in advance with the first region.

3. The apparatus according to claim 1 further comprising:
   a first writing head for writing the data to the tape medium; and
   a second writing head for writing the identification information to the tape medium.

4. An apparatus for writing data designated by an upper-level apparatus to a tape medium, comprising:
   a first obtaining unit for obtaining the data designated by the upper-level apparatus;
   a second obtaining unit for obtaining identification information used by the upper-level apparatus to identify the data obtained by the first obtaining unit; and
   a writing unit for writing the data obtained by the first obtaining unit to the tape medium at a first frequency, and writing the identification information obtained by the second obtaining unit to the tape medium at a second frequency that is lower than the first frequency,
   wherein the second frequency is approximately the same as that of a servo pattern which is recorded in advance to the tape medium, and which indicates a longitudinal position.

5. An apparatus for reading data designated by an upper-level apparatus from a tape medium, comprising:
- a reading unit for reading each piece of identification information as first identification information from the tape medium to which each piece of data is recorded at a first frequency, and to which each piece of the identification information, used by the upper-level apparatus to identify each piece of the data, is recorded at a second frequency that is lower than the first frequency;
- an obtaining unit for obtaining, as second identification information, identification information of specific data designated by the upper-level apparatus; and
- a determination unit for determining whether or not to read the specific data from the tape medium in accordance with the first identification information read by the reading unit and the second identification information obtained by the obtaining unit.

6. The apparatus according to claim 5 further comprising:
- a first reading head for reading the data from the tape medium; and
- a second reading head for reading the first identification information from the tape medium.

7. The apparatus according to claim 5, wherein the reading unit reads the data by running the tape medium at a first speed, and reading the first identification information by running the tape medium at a second speed that is faster than the first speed.

8. The apparatus according to claim 7, wherein when the determination unit determines to read the specific data, the reading unit reads the specific data by lowering the running speed of the tape medium from the second speed to the first speed.

9. The apparatus according to claim 7, wherein
- a portion of the tape medium to which each piece of data is recorded, and a portion of the tape medium to which identification information of each piece of the data is recorded, overlap with each other transversely on the tape medium, and
- when the determination unit determines to read the specific data, the reading unit runs the tape medium in the reverse direction, and thereafter reads the specific data by running the tape medium in the forward direction again at the first speed.

10. A method for writing data designated by an upper-level apparatus to a tape medium, the method comprising:
- obtaining the data designated by the upper-level apparatus;
- obtaining identification information used by the upper-level apparatus to identify the data; and
- writing the data to the tape medium at a first frequency in a user data region of the tape medium that is laterally displaced from a longitudinal servo pattern region of the tape medium, and writing the identification information to the tape medium at a second frequency that is lower than the first frequency.

11. A tape medium for recording information, comprising:
- a first region on which data is recorded at a first frequency;
- a second region on which identification information, used by an apparatus for processing the data to identify the data, is recorded at a second frequency that is lower than the first frequency; and
- a third region on which servo information is recorded.

12. The tape medium according to claim 11, wherein the second region is a region that overlaps with the first region transversely on the tape medium.

13. The tape medium according to claim 11 further comprising: a third region on which a servo pattern indicating a longitudinal position is recorded at a third frequency, wherein the second frequency is approximately the same as the third frequency.

14. The tape medium according to claim 11, wherein the first region is laterally displaced from the third region on the tape medium in a direction perpendicular to a length of the tape medium.

15. The tape medium according to claim 11, wherein the second region is laterally displaced from the third region on the tape medium in a direction perpendicular to a length of the tape medium.

16. The apparatus according to claim 1, wherein the data obtained by the first obtaining unit is written to the tape medium at a first frequency in a user data region of the tape medium that is laterally displaced from a longitudinal servo pattern region of the tape medium.

17. The apparatus according to claim 1, wherein the identification information is written to a metadata region of the tape medium that is laterally displaced from a longitudinal servo pattern region of the tape medium.

* * * * *